United States Patent [19]
Habasko et al.

[11] 3,926,841
[45] Dec. 16, 1975

[54] ANTI-CAKING COMPOSITION

[75] Inventors: Werner Habasko; Rudolf Syrovatka, both of Vienna, Austria

[73] Assignee: Lever Brothers Company, New York, N.Y.

[22] Filed: June 1, 1973

[21] Appl. No.: 365,885

[30] Foreign Application Priority Data
June 5, 1972 United Kingdom............... 26048/72
Jan. 15, 1973 United Kingdom................. 1995/73

[52] U.S. Cl. .............. 252/383; 71/64 DB; 71/64 E; 252/384; 427/212; 427/242; 427/424
[51] Int. Cl.²....................... C05G 3/00; C09K 3/00
[58] Field of Search.................. 252/384, 383, 382; 117/100 B, 100 A; 71/64 E, 64 D, 64 B, 64 DB; 427/424, 212, 242; 428/403

[56] References Cited
UNITED STATES PATENTS
3,186,828 6/1965 Baarson .............................. 252/384
3,305,491 2/1967 Oster ................................. 252/384

*Primary Examiner*—Samuel Feinberg
*Assistant Examiner*—Ralph Palo
*Attorney, Agent, or Firm*—Arnold Grant, Esq.

[57] ABSTRACT

An improved anti-caking composition for addition to particulate salts, particularly fertilizer particles, to prevent their coalescence and caking, containing a cationic aliphatic amine and a carboxylic acid, is provided by the inclusion of a small amount of an alkali.

6 Claims, No Drawings

ANTI-CAKING COMPOSITION

BACKGROUND OF THE INVENTION

1. Field of the Invention

The invention relates to anti-caking compositions for conditioning particulate materials, especially hygroscopic materials, which normally tend to coalesce and cake during storage owing to the effects of moisture, temperature and/or pressure. More particularly the invention relates to a novel anti-caking composition which, when applied to hygroscopic particles, especially fertilizer particles, prevents their coalescence and caking during storage.

2. Description of the Prior Art

Caking during storage has long been a troublesome and annoying problem with chemical fertilizers. Fertilizer materials which cake are not amenable to usual bulk storage and handling techniques and after storage cannot be spread with mechanical distribution devices. To reduce this tendency of caking many of the present-day fertilizers are produced in granulated form, the particles being of a relatively uniform size ranging in diameter from 1–4 millimeters. However, granulated fertilizers still suffer from caking during storage and several treatments have been suggested and put into practice to try and overcome this serious defect; none of them have led to a fully satisfactory result.

One of the hitherto known methods in practice comprises the spraying of a 30–70% solution of an aliphatic primary amine, e.g. fatty amine, in a mineral oil onto the agitated particulate material. This method is disclosed in U.S. Pat. No. 3,186,828.

It has also been suggested in U.S. Pat. No. 3,305,491 to prevent caking of fertilizers and salts by adding a catio-anio surface-active composition comprising an acid mixture of cationic fatty amines and fatty acids.

Further, from U.S Pat. Nos. 3,234,003, 3,234,006 and 3,250,607 a conditioning agent is known in the form of a powder, which is obtained by coating microscopic particles of certain clays with a small amount of a solution of a hydrophobic aliphatic amine in a mineral oil. The coated clay product thus obtained is dusted on the surface of the fertilizer granules or prills.

In all instances, so it appears, the presence of an aliphatic amine in the anti-caking agents is believed to be important to prevent caking by providing on the surface of the fertilizer granule a hydrophobic film which curtails absorption of water by the granules.

SUMMARY OF THE INVENTION

A principal object of the present invention is the provision of an improved anti-caking composition for conditioning particles of fertilizer or other salts.

Another object of the invention is the provision of an improved method for conditioning particulate material.

Still another object of this invention is the provision of substantially non-caking salt compositions, particularly fertilizer compositions.

DESCRIPTION OF THE INVENTION

It has now been found that caking of salts and chemical fertilizers can be prevented to a considerable extent if the granules are treated with a composition comprising a cationic amine material, a carboxylic acid and an alkali.

Although not strictly necessary, it is convenient if an inert organic solvent is used for diluting said ingredients in the composition.

Accordingly, the invention provides an anti-caking composition comprising the following active components:

1. a cationic aliphatic amine material selected from the group consisting of amines having the formulae $RR_1R_2N$ and $RNHCH_2CH_2CH_2NH_2$, wherein R is an aliphatic hydrocarbon radical containing from 8–22 carbon atoms; $R_1$ and $R_2$ are each either H or an alkyl group containing 1–22 carbon atoms;
2. an aliphatic or cyclo-aliphatic carboxylic acid having from 8–22 carbon atoms in the molecule, or polymers thereof;
3. an organic and/or inorganic alkali.

It has been established that the presence of a small amount of an alkali already gives a considerable improvement in the performance of the product. Apparently a synergistic action is exerted by the combination of alkali and the aliphatic amine, with the consequence that the proportion of aliphatic amine in the composition can be reduced to a considerable extent. A possible explanation therefor could be that said alkali activates strongly the ionisation of carboxylic acid, much more so than aliphatic amine might do, with the result that the reaction between carboxylate ions and the cations on the granule surface is promoted, thereby forming a chemical protective layer around the granule surface.

Pure aliphatic amines of the formula $R_1R_2R_3N$ or $RNHCH_2CH_2Ch_2NH_2$ (wherein R, $R_1$ and $R_2$ are as defined above) can be used singly or in combination in carrying out the invention, and the aliphatic radical of the amines can be saturated or unsaturated. Representative pure amines include octylamine, decylamine, decenylamine, hexadecylamine, octadecylamine, octadecenylamine, octadecadienylamine, eicosylamine, dihexadecylamine and dioctylmethylamine. Preferred amines are commercial mixtures obtained from hydrolysis of animal and vegetable fats, such as coconut oil, soybean oil, tallow or cottonseed oil, followed by ammonolysis, dehydration and hydrogenation. The resultant amines consist predominantly of mixtures of saturated and unsaturated primary n-aliphatic amines containing from 12–20 carbon atoms, depending upon the oil that is employed as a starting material.

Examples of carboxylic acids which can be suitably used in the above-mentioned combination include fatty acids having from 8–22 carbon atoms, such as those which are obtained from synthesis, or from hydrolysis of naturally occurring animal and vegetable fats, such as coconut oil, soybean oil, tallow, cottonseed oil and the like; cyclised fatty acids having from 8–22 carbon atoms in the molecule, such as those obtained from the cyclisation of unsaturated fatty acids, such as linseed oil, wood oil fatty acids and the like, e.g. by the process as described in U.S. Pat. No. 3,041,360; polycarboxylic acids having 8–22 carbon atoms and polymeric fatty acids; modified fatty acids, such as sulphonated fatty acids, alkylpolyethyleneglycol carboxylic acids etc.

Inorganic alkalies which can be used in the invention include the non-alkali metal hydroxides, such as magnesium, zinc, nickel and aluminium hydroxides. As the organic alkalies which are suitable for use in the invention can be mentioned the lower alkanol amines of which the alkanol moiety has 2–4 carbon atoms.

Typical illustrative lower alkanol amines include mono-, di- and tri-, ethanol-, propanol- and butanol amines, oxazines and morpholines.

Examples of suitable solvents include mineral oil, kerosene, pine oil, paraffin wax, polyethylene and polypropylene waxes, liquid ethylene oxide condensation products, such as polyethylene glycol, and also aliphatic nitriles as disclosed in U.S. Pat. No. 3,186,828. Typical mineral oils are e.g. machine oil, paraffin oil and gas oil fractions of petroleum distillates. Preferred solvents are mineral oil and paraffin wax.

Preferred cationic aliphatic amines for use in the composition of the invention are primary fatty amines having from 12–20 carbon atoms. Particularly preferred are fatty amines derived from natural oils, e.g. soybean oil and tallow, in which the aliphatic groups consist for the major part of a mixture of $C_{16}$ and $C_{18}$ hydrocarbons.

The preferred carboxylic acids for use in the composition of the invention are fatty acids having a chain length of 8–20 carbon atoms.

Particularly preferred are mixed fatty acids containing substantial proportions of $C_8$–$C_{14}$ fatty acids, such as those obtained from hydrolyses of coconut and palmkernel oils.

Preferred lower alkanol amines for use in the instant composition are mono-, di- and triethanolamines. Preferred inorganic alkalies are aluminium hydroxide and zinc hydroxide.

The composition of the present invention may comprise from 1–20%, preferably 4–12% of component (1), from 3–80%, preferably 5–30% of component (2), from 0.1–5%, preferably 0.5–2%, of component (3). A inert solvent may be added as desirable in any amount up to about 90%.

In one preferred embodiment of the invention the anti-caking agent comprises an organic solvent base containing 4–12% of component (1), 5–30% of component (2), and 0.5–2% of component (3).

All percentages are percentages by weight of the total composition.

The composition of the invention may be prepared by admixing the active components (1), (2) and (3) with the solvent in suitable proportions. The solvent, e.g. mineral oil, is normally heated to about 60°–70°C and the components (2), (3) and (1) can then be blended therein. This sequence of adding the components into the solvent is preferably followed, in order to aid the dissolution of the aliphatic amine material. In case an inorganic alkali is used, this component may conveniently be added in the form of a fatty acid soap.

The composition of the invention is a manageable liquid already at a temperature of about 40°C and will normally be sprayed at a temperature of 60°–80°C onto the fertilizer granules in a suitable mixing equipment, where it is quickly and uniformly distributed over the granulated mass due to its high spreading capacity.

Some amide may be formed during prolonged storage of the composition, particularly at elevated temperatures, as a result of a condensation between the carboxylic acid and the amine. The presence of any such amide in the composition however does not have a marked influence on the performance of the product.

An advantage of the composition of the invention is that it can be conveniently sprayed onto the granulates in existing equipment normally used for conditioning, e.g. a rotating drum mixer or a screw conveyer mixer. Under practical conditions the amount of anti-caking agent according to the invention required to condition fertilizer particles will be within the same order of percentages as is normally taken for liquid anti-caking agents, i.e. between 0.07% and 0.20%, calculated on the weight of the treated material.

A further particular advantage of the present invention is that a complete protection can be achieved by a single treatment with the composition of the invention. Fertilizers treated according to the invention therefore remain non-dusty, can be stored and handled without the inconvenience of dust formation, and remain free-flowing even on prolonged storage.

Used in amounts of about 0.03–0.25% by weight of the salt or fertilizer particulate material, the compositions of the invention are particularly effective in conditioning single and multiple component fertilizers, such as high-nitrogen fertilizers and NPK-fertilizers to secure non-caking thereof.

Accordingly, the invention includes salt and fertilizer compositions treated with an anti-caking composition as hereinbefore defined, the particles of which are provided with an anti-caking coating comprising as active components:

1–20 parts by weight of a cationic aliphatic amine selected from the group consisting of amines having the formulae $RR_1R_2N$ and $RNHCH_2CH_2CH_2NH_2$, wherein R is an aliphatic hydrocarbon radical containing from 8–22 carbon atoms and $R_1$ and $R_2$ are each either H or an alkyl group containing 1–22 carbon atoms;

3–80 parts by weight of an aliphatic or cyclo-aliphatic carboxylic acid having from 8–22 carbon atoms in the molecule; and 0.1–5 parts by weight of an alkali.

The composition of the invention as compared with conventional compositions usually contains a much lower percentage of the aliphatic amine component and yet, used in the normal dosage, gives a surprisingly good anti-caking effect, as is shown in the following examples.

EXAMPLE 1

The following anti-caking composition was prepared:

| Composition I | % by weight |
|---|---|
| stearylamine (mixture of predominantly $C_{16}$ and $C_{18}$ aliphatic primary amines) | 10.0 |
| distilled coconut fatty acids | 15.0 |
| diethanolamine | 2.0 |
| mineral oil | 73.0 |

This composition was sprayed onto commercial high-nitrogen fertilizer granules in an amount of 0.15% by weight of the granulated mass. The results were compared with a composition A, comprising 35% fatty amine and 65% mineral oil, and composition B, comprising 10% stearylamine, 25% coconut fatty acids, and 65% mineral oil, using the following test-method.

CAKING TEST-METHOD

The rate of caking of fertilizers in the laboratory is determined by forming a press-sample thereof in a cylinder. The load exerted upon it amounts to 0.7 kg/cm$^2$; duration of load 24 hours.

The force needed to extract an anchor-disc imbedded in the sample is measured. This force, read in grams, gives a measure as to the tendency to cake of the particulate mass. Higher values represent therefore a stronger tendency to cake.

An ideal case would be if the press-sample disintegrates immediately from the cylinder upon lifting.

TABLE I

| Caking test results (readings in grams) | |
| --- | --- |
| Composition I | 130 |
| Composition A | 430 |
| Composition B | 340 |

The untreated fertilizer had a caking test value of 1450.

EXAMPLE 2

This example shows that lower dosages of the composition according to the invention still give superior effects as compared with liquid compositions known in the art used at the normal dosage of 0.15% by weight.

Composition I of Example 1 was sprayed onto commercial high-nitrogen fertilizer particles at dosages of 0.07%, 0.10% and 0.15% by weight.

The caking tests showed the following average values of the forces required:

| Composition I | at 0.07% | — | 180 |
| --- | --- | --- | --- |
| Composition I | at 0.10% | — | 150 |
| Composition I | at 0.15% | — | 135 |

EXAMPLE 3
The following composition was prepared:

| Composition II | % by weight |
| --- | --- |
| Tallow amine | 5.0 |
| Lauric acid | 8.0 |
| Mono-ethanolamine | 1.0 |
| Paraffin wax | 20.0 |
| Mineral oil | 66.0 |

This composition was sprayed onto commercial high-nitrogen fertilizer granules in an amount of 0.20% by weight of the granulated mass. The caking test showed an average value of 170.

EXAMPLE 4

The present composition is particularly effective for treating multiple fertilizers.

| Composition III | % by weight |
| --- | --- |
| Oleylamine | 12.0 |
| Stearic acid | 1.5 |
| Aluminium mono/distearate | 6.0 |
| Paraffin wax | 15.0 |
| Mineral oil | 65.5 |

0.15% by weight of this composition was sprayed onto commercial NPK-granules (15/15/15). The following results were obtained:

TABLE II

| Caking test results (force in grams) | |
| --- | --- |
| Untreated NPK fertilizer | 1150 |
| NPK-fertilizer treated with: 0.15% Composition A of Example 1 | 400 |
| NPK-fertilizer treated with: 0.15% Composition A of Example 1 – 0.5% fine silica | 290 |
| NPK-fertilizer treated with: 0.15% Composition B | 505 |

TABLE II-continued

| Caking test results (force in grams) | |
| --- | --- |
| of Example 1 NPK-fertilizer treated with: 0.15% Composition III | 270 |

As shown in the above table, the invention can be used to replace a two-step conditioning process which is normally employed for multiple fertilizers, with at least equal results.

EXAMPLE 5

The following composition was prepared:

| Composition V | % by weight |
| --- | --- |
| Stearylamine | 8.0 |
| Azelaic acid | 5.1 |
| Diethanolamine | 1.5 |
| Mineral oil | 85.4 |

This composition was sprayed onto commercial high-nitrogen fertilizer granules in an amount of 0.15% by weight of the granulated mass. A caking test was carried out and the result was compared with a parallel test on the same commercial granules treated with composition I of Example 1.

The following readings were obtained:
Composition I → 55
Composition V → 40

These readings show that both compositions were comparable in their performance.

EXAMPLES 6–7

A similar comparative test was carried out with the following two compositions:

| Compositions | VI | VII |
| --- | --- | --- |
| Stearylamine | 2.0% | 8.0% |
| Coconut fatty acid stearylamide | 10.0% | — |
| Coconut fatty acid | 6.5% | 65.0% |
| Diethanolamine | 1.5% | 2.0% |
| Mineral oil | 80.0% | — |
| Mixture of polyethylene glycols (Carbowax 400 + 1500) | — | 25.0% |

The following readings were obtained:
Composition VI → 125
Composition VII → 115
Composition I → 115

These results show that compositions VI and VII were equivalent to composition I in their anti-caking behaviour. The results also show that the presence of a fatty amide in the composition does not have a disturbing effect on the performance of the basic composition of the invention.

What is claimed is:

1. a composition for reducing caking of fertilizer particles comprising:
    1. 1 to 20 percent by weight of a cationic aliphatic amine selected from the group consisting of amines having the formulae $RR_1R_2N$ and $RNHCH_2CH_2CH_2NH_2$, wherein R is an aliphatic hydrocarbon radical containing from 8 to 22 carbon atoms and $R_1$ and $R_2$ are selected from the group consisting of H and alkyls containing 1 to 22 carbon atoms;

2. 3 to 80 percent by weight of a carboxylic acid selected from the group consisting of aliphatic and cycloaliphatic carboxylic acids having from 8 to 22 carbon atoms in the molecule;
3. 0.1 to 5 percent by weight of an alkali selected from the group consisting of lower alkanol amines wherein the alkanol moiety has from 2 to 4 carbon atoms and hydroxides selected from the group consisting of magnesium, zinc, nickel and aluminium hydroxide; and,
4. up to 90 percent by weight of an inert organic solvent selected from the group consisting of mineral oils, waxes, polyethylene glycols and mixtures thereof.

2. Anti-caking composition according to claim 1, which comprises an organic solvent base containing 4–12% by weight of component (1), 5–30% by weight of component (2) and 0.5–2% by weight of component (3).

3. Anti-caking composition according to claim 1, which component (1) is a primary amine containing from 12–20 carbon atoms.

4. Anti-caking composition according to claim 1, in which component (2) is a fatty acid having a chain length of 8–20 carbon atoms.

5. Anti-caking composition according to claim 1, in which as lower alkanol amine is used mono-, di- or triethanolamine.

6. Anti-caking composition according to claim 1, in which as hydroxide is used aluminium hydroxide or zinc hydroxide.

* * * * *